(12) United States Patent
Serres et al.

(10) Patent No.: US 8,424,304 B2
(45) Date of Patent: Apr. 23, 2013

(54) TURBINE ASSEMBLY FOR A TURBOCHARGER, HAVING TWO ASYMMETRIC VOLUTES THAT ARE SEQUENTIALLY ACTIVATED, AND ASSOCIATED METHOD

(75) Inventors: Nicolas Serres, Morristown, NJ (US); Michael Ladonnet, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 706 days.

(21) Appl. No.: 12/611,809

(22) Filed: Nov. 3, 2009

(65) Prior Publication Data
US 2011/0099998 A1 May 5, 2011

(51) Int. Cl.
*F02D 23/00* (2006.01)
(52) U.S. Cl.
USPC .............................. 60/602; 60/600
(58) Field of Classification Search ............ 60/600, 60/602, 605.01; 415/205, 1, 36, 38, 39, 44, 415/45, 26, 28, 49, 144–145, 147, 151
See application file for complete search history.

(56) References Cited

U.S. PATENT DOCUMENTS

| | | | |
|---|---|---|---|
| 3,614,259 A * | 10/1971 | Neff | 415/205 |
| 4,179,892 A | 12/1979 | Heydrich | |
| 4,825,523 A * | 5/1989 | Nakazawa et al. | 29/889.2 |
| 5,867,987 A * | 2/1999 | Halimi et al. | 60/602 |
| 6,220,031 B1 | 4/2001 | Sumser et al. | |
| 6,324,847 B1 | 12/2001 | Pierpont | |
| 6,672,061 B2 | 1/2004 | Schmid et al. | |
| 6,694,735 B2 | 2/2004 | Sumser et al. | |
| 6,941,755 B2 * | 9/2005 | Bucknell et al. | 60/602 |
| 2003/0115875 A1 | 6/2003 | Sumser et al. | |
| 2005/0247058 A1 * | 11/2005 | Pedersen et al. | 60/599 |
| 2007/0209361 A1 * | 9/2007 | Pedersen et al. | 60/602 |
| 2008/0271449 A1 * | 11/2008 | Roberts et al. | 60/602 |

FOREIGN PATENT DOCUMENTS

| | | |
|---|---|---|
| DE | 102006019780 | 8/2007 |
| DE | 102006022181 | 11/2007 |
| DE | 102006022182 | 11/2007 |
| EP | 1570161 | 11/2003 |
| EP | 1778966 | 8/2005 |
| EP | 1650415 | 4/2006 |
| WO | WO 2004074642 A1 * | 9/2004 |
| WO | 2006000361 | 5/2006 |

* cited by examiner

*Primary Examiner* — Thomas Denion
*Assistant Examiner* — Patrick Maines
(74) *Attorney, Agent, or Firm* — Alston & Bird LLP

(57) ABSTRACT

A turbine assembly for an exhaust gas turbocharger has separate first and second volutes that are sequentially activated via a valve that receives exhaust gases from an engine. In a first position of the valve, only the first volute receives exhaust gas; in a second position, both volutes receive exhaust gases. In a third position, a bypass passage is also opened so that some exhaust gas bypasses the turbine wheel. Unlike conventional twin-scroll turbines, each volute receives exhaust gases from all engine cylinders, and the first volute feeds gas into the B-width portion of the wheel, while the second volute feeds gas into the wheel after the contour portion.

13 Claims, 6 Drawing Sheets

TURBINE ASSEMBLY FOR A TURBOCHARGER, HAVING TWO ASYMMETRIC VOLUTES THAT ARE SEQUENTIALLY ACTIVATED, AND ASSOCIATED METHOD

BACKGROUND OF THE INVENTION

The present disclosure generally relates to turbochargers for internal combustion engines, and more particularly relates to a turbine assembly for a turbocharger, and to a method for operating a turbocharged internal combustion engine system.

A turbine assembly of a turbocharger for an internal combustion engine generally must be able to operate with acceptable performance over a range of exhaust gas flow rates as engine operating conditions change. Depending on the engine characteristics, in some cases this requires a fairly sophisticated variable-geometry nozzle in the turbine assembly to regulate the flow of exhaust gas into the turbine wheel as the engine operating condition changes.

In some applications there is a desire to avoid such variable-geometry nozzles and instead use a simpler fixed-geometry turbine nozzle. The challenge presented in some cases is achieving a sufficiently wide flow range capability with the fixed geometry.

BRIEF SUMMARY OF THE DISCLOSURE

The present disclosure is directed to a turbine assembly suitable for (though not necessarily limited to) fixed-geometry turbines, and able to achieve a relatively wide flow range capability. A turbine assembly in accordance with one embodiment described herein comprises a turbine housing having an exhaust gas inlet for receiving exhaust gas from the engine, a bore for conducting a flow of exhaust gas out of the turbine housing in an axial direction, and a twin volute surrounding the bore, the twin volute comprising a first volute and a second volute that is divided and separated from the first volute. The first volute is connected to and receives exhaust gas from the exhaust gas inlet. The turbine assembly further includes a turbine wheel rotatably mounted in the bore.

The first volute has an outlet portion configured to direct exhaust gas into a first portion of the turbine wheel, while the second volute has an outlet portion configured to direct exhaust gas into a second portion of the turbine wheel located downstream of the first portion of the turbine wheel with respect to the axial direction.

The turbine assembly also includes a valve arranged to receive exhaust gas from the engine, the valve defining a valve cavity connected to the second volute but not to the first volute. The valve further comprises a valve member movable between a first position allowing exhaust gas to flow to the first volute but preventing exhaust gas from flowing from the valve cavity to the second volute, and a second position allowing exhaust gas to flow to the first volute and to flow from the valve cavity to the second volute.

Thus, the first and second volutes are sequentially activatable by adjusting the position of the valve. At relatively low exhaust gas flow rates, all of the exhaust gases from the engine can flow to the first volute only, and the second volute is inactive. At higher flow rates, the valve can be opened to allow some of the total exhaust gas flow to pass into the second volute, such that both volutes are active.

In one embodiment, there is also a bypass passage connected between the valve cavity and the bore of the turbine housing downstream of the turbine wheel, and the valve member is movable into a third position allowing some of the total exhaust gas flow to pass through the bypass passage into the bore. In this condition, both volutes are active and additionally there is bypass of exhaust gas around the turbine wheel. This arrangement allows a greater flow rate than could be achieved if all of the exhaust gas had to pass through the turbine wheel.

In some embodiments of the turbine assembly, the second volute can have a larger volume, or more precisely, a larger A/R ratio, than the first volute. The A/R ratio is a ratio between the volute's cross-sectional flow area and the radius at the centroid of that area, as measured from the turbine wheel's rotational axis. An advantage of this arrangement is that the first volute can be sized relatively small so it is optimized for low-flow conditions in which only the first volute is activated; when a greater amount of exhaust gas flow must be passed, the second volute can be activated, and the second volute can be designed specifically for such higher-flow conditions.

Unlike a conventional twin-scroll turbine assembly, the turbine assembly described herein can be used with engines having an odd number of cylinders, because all engine cylinders feed their exhaust gases as a commingled stream that is then supplied into the first volute alone (at low-flow conditions), or into both the first and second volutes (at higher-flow conditions), or into both volutes and into the bypass passage (at highest-flow conditions). In contrast, conventional twin-scroll turbines are typically used only for engines with an even number of cylinders because half of the cylinders feed one of the scrolls and the other half of the cylinders feed the other scroll.

The turbine assembly described herein further differs from conventional twin-scroll turbines in the way the scrolls or volutes are arranged with respect to the "B-width" and "contour" portions of the turbine wheel. The B-width portion is the largest-diameter portion of the wheel formed by the leading edges of the turbine blades, and typically is linear or nearly linear as viewed in a radial-axial projection of the wheel. The B-width of the wheel is the axial length of the B-width portion in radial-axial projection, and is a rough measure or indication of the maximum-flow capacity of the wheel. The B-width portion, as viewed in radial-axial projection, may be substantially constant in diameter in the axial direction, or it may be of the "mixed-flow" type such that its diameter decreases in the downstream axial direction. The turbine wheel typically has a "contour" portion following the B-width portion, and a final portion following the contour portion. The contour portion as viewed in radial-axial projection typically is concave in the radially outward direction. The throat (minimum flow area) of each blade passage is located in the final portion of the wheel. In a conventional twin-scroll turbine, both scrolls feed exhaust gas into the B-width portion of the wheel. Thus, the B-width portion acts as a bottleneck.

With the turbine assembly of the present application, however, only the first volute feeds exhaust gas into the B-width portion, and hence the outlet portion of the first volute can have an axial width substantially equal to the B-width, whereas in a conventional twin-scroll turbine, both scrolls' outlet portions (and the dividing wall between them) must fit into the B-width. The second volute feeds exhaust gas into the final portion of the wheel, closer to the throat. The advantage of this arrangement is that the volutes can pass a larger amount of flow, which all still goes into the turbine wheel.

In one embodiment described herein, the valve cavity of the valve is defined by an integral portion of the turbine housing. The valve cavity is spatially located between the exhaust gas inlet of the turbine housing and the bore of the turbine housing. The bypass passage is spatially located between the valve cavity and the bore of the turbine housing. The valve member is mounted in the turbine housing so as to be rotatable about a pivot point when moving between the first (closed), second (partially open), and third (fully open) positions.

The valve cavity has a proximal end adjacent the bypass passage and an opposite distal end, and a valve seat is defined by the turbine housing at the distal end of the valve cavity, the valve member having a distal end portion engaging the valve seat in the closed position. The valve member has a proximal portion configured such that in the second (partially open) position of the valve member the proximal portion occupies and substantially closes off the bypass passage. The valve is configured and arranged such that in the third (fully open) position the valve member is completely withdrawn from the valve cavity and the bypass passage.

In one embodiment, the valve member can be arranged such that the second (partially open) position and/or the third (fully open) position is adjustable for regulating flow rate through the second volute and/or bypass passage.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
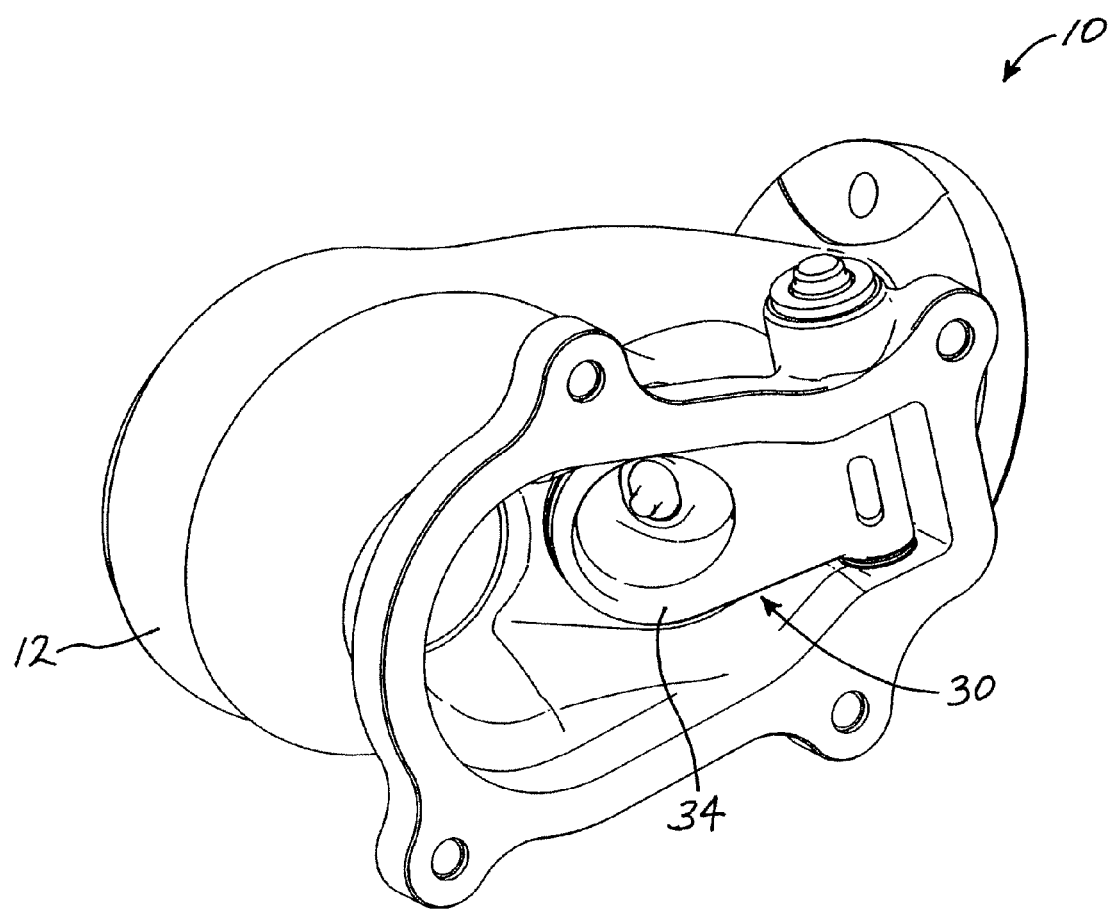
FIG. 1 is a perspective view of a turbine assembly in accordance with one embodiment of the present invention.
Figure 2:
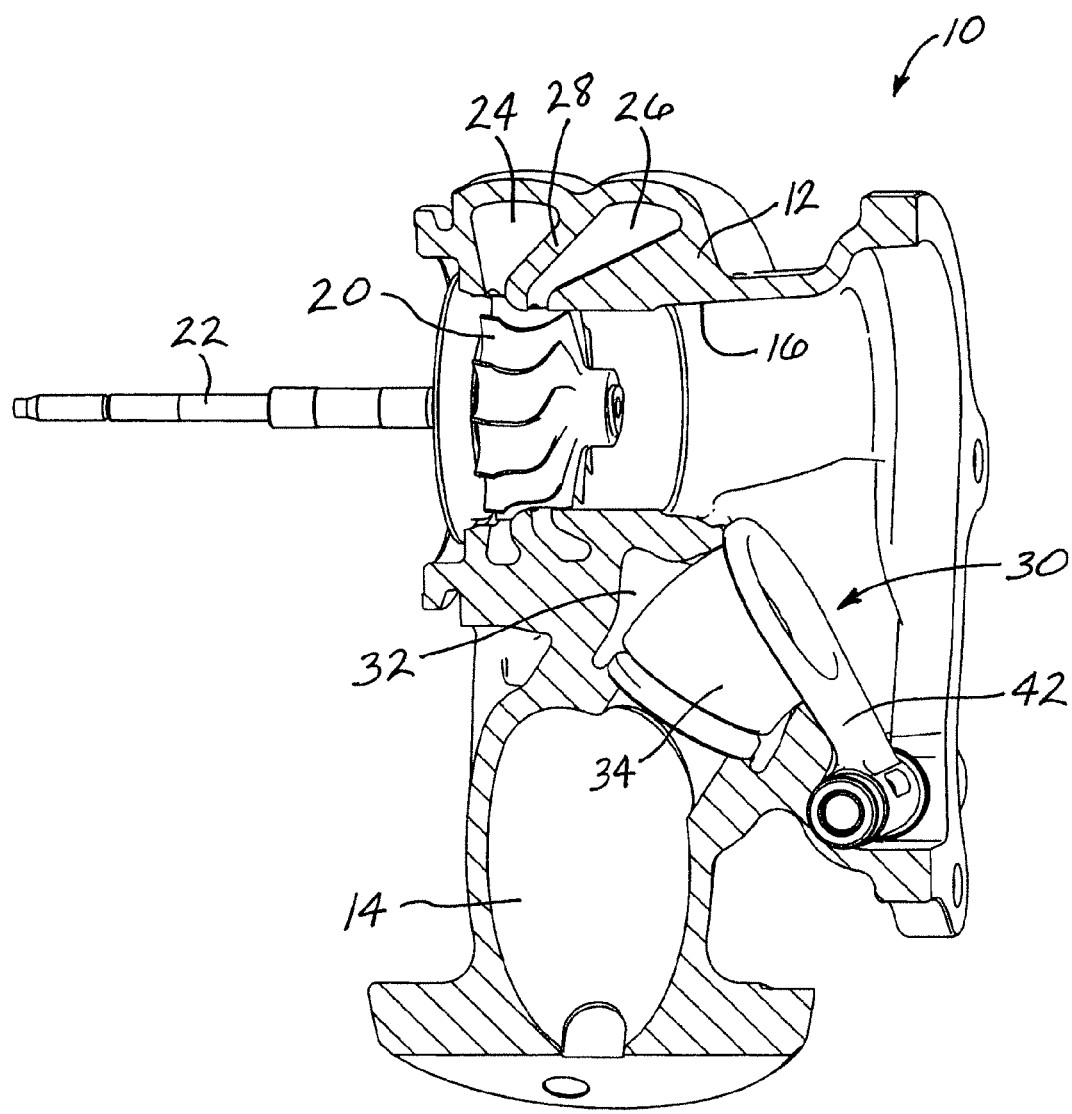
FIG. 2 is a perspective view of the turbine assembly of FIG. 1, which has been sectioned to show internal details.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIGS. 1-5 illustrate a turbine assembly 10 in accordance with one embodiment of the invention described herein. The turbine assembly includes a turbine housing 12 having an exhaust gas inlet 14 that receives a stream of commingled exhaust gases from the cylinders of an internal combustion engine. The turbine assembly further comprises a turbine wheel 20 mounted within the turbine housing and connected to a shaft 22 whose opposite end is connected to a compressor (not shown) when the turbine assembly is part of a turbocharger for boosting performance of the engine. The turbine housing defines a bore 16 that extends along an axial direction generally parallel to the rotation axis of the turbine wheel 20. After exhaust gases have passed through the turbine wheel, the gases are discharged in the axial direction through the bore 16.

Figure 5:
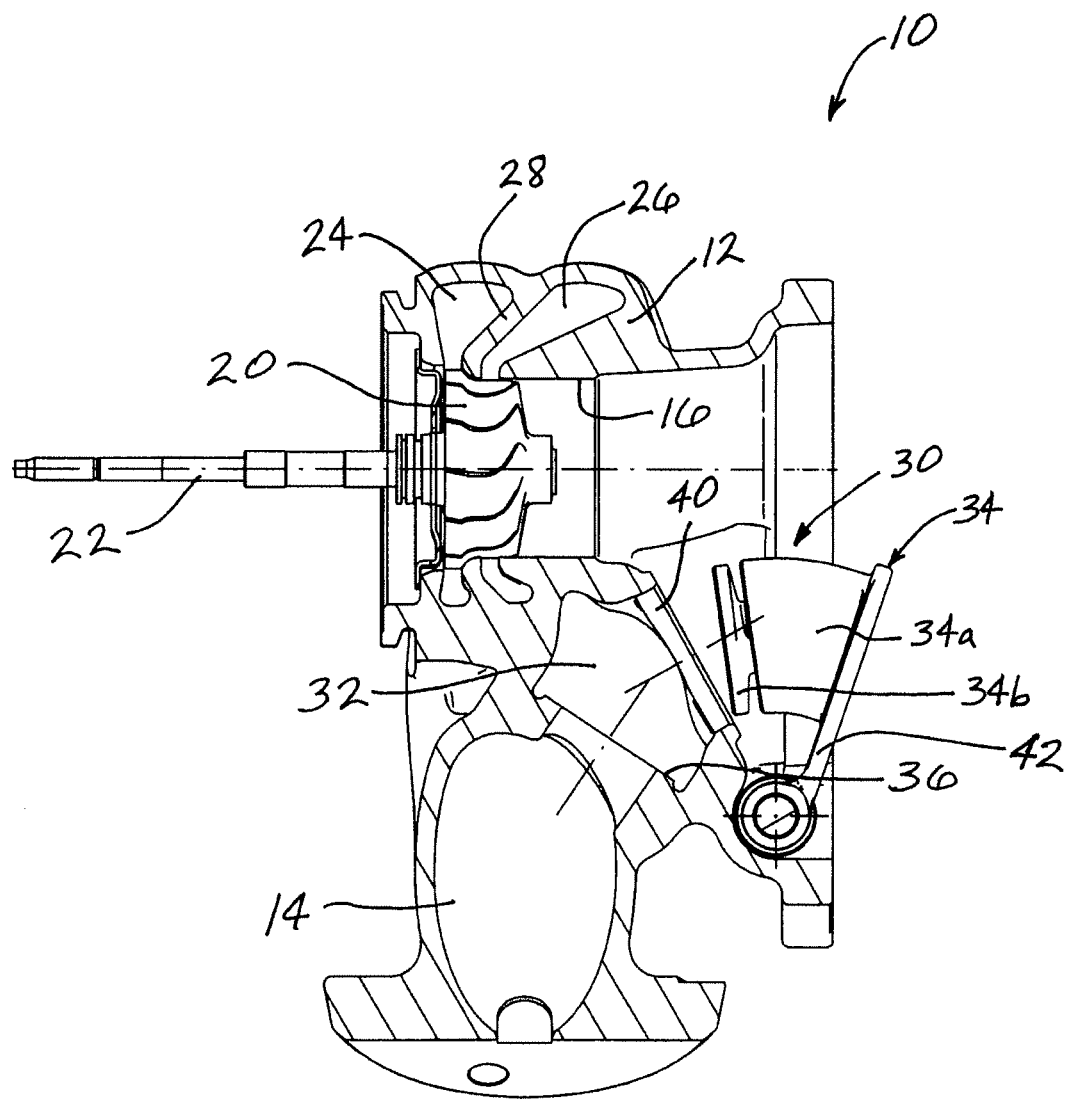
FIG. 5 is a sectioned side view of the turbine assembly with the valve in a fully open position.
Figure 5A:
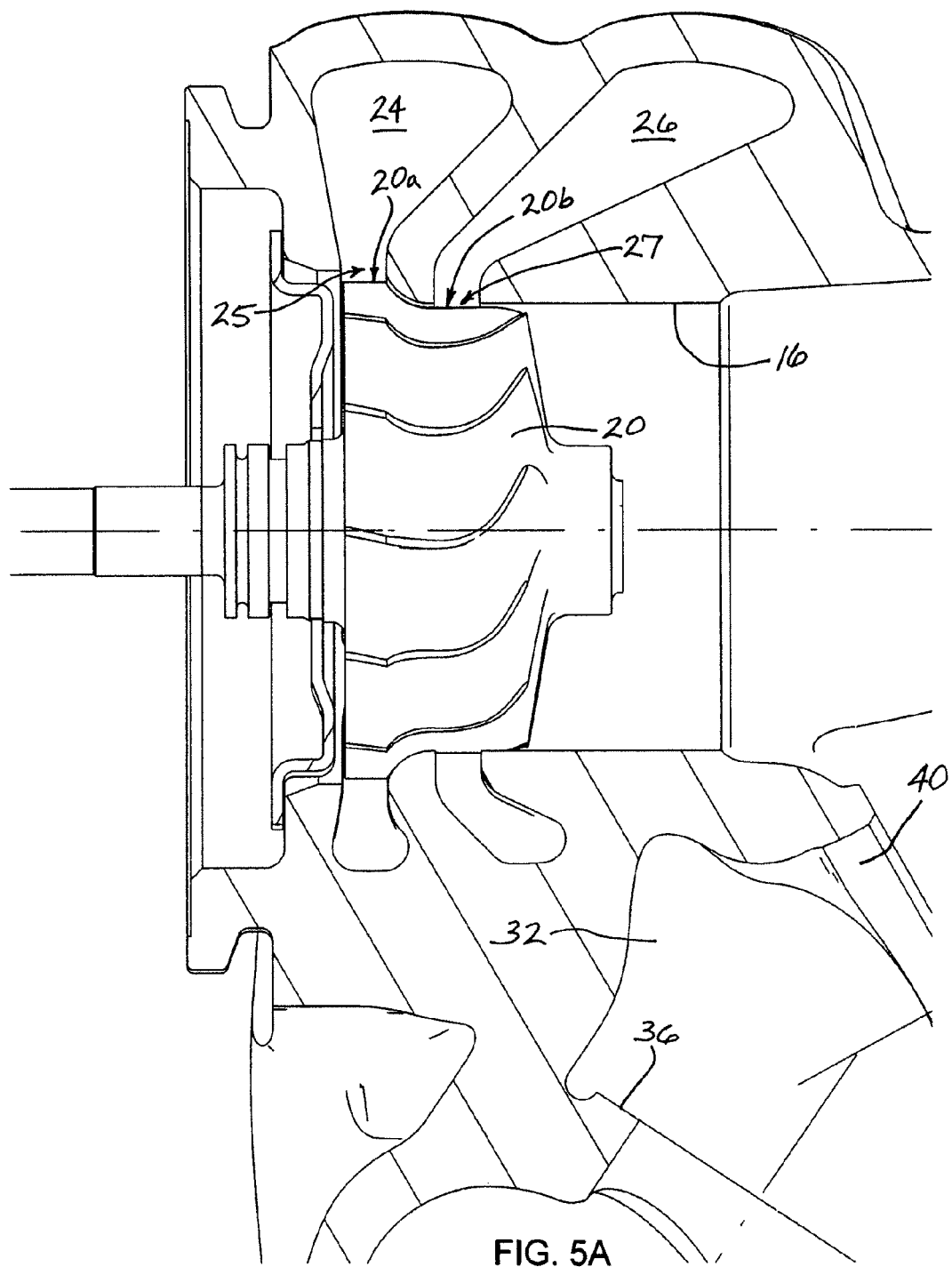
FIG. 5A is a sectioned side view of the turbine assembly on an enlarged scale relative to FIG. 5.

The turbine housing 12 further comprises a twin volute having a first volute 24 and a second volute 26 that surround the turbine wheel 20. The volutes 24, 26 are divided and separated from each other by a dividing wall 28. The volutes 24, 26 receive exhaust gas from the exhaust gas inlet 14 and feed the gas into the turbine wheel. Thus, the first volute 24 has an outlet portion 25 (FIG. 5A) at a radially inner side of the volute, through which exhaust gas is discharged from the volute into the turbine wheel. Similarly, the second volute 26 has an outlet portion 27 through which exhaust gas is discharged from the volute into the turbine wheel.

Although not visible in the figures, the exhaust gas inlet 14 is connected to the first volute 24 such that the first volute always receives exhaust gas from the engine. However, the second volute 26 receives exhaust gas only during higher-flow operating conditions where the first volute 24 alone is inadequate for passing the flow. In this regard, the turbine assembly 10 includes a valve 30 operable to either prevent or allow exhaust gas flow into the second volute 26. In the illustrated embodiment, the valve 30 is integrated into the turbine housing 12, but alternatively it could be separate from the turbine housing (e.g., integrated into an exhaust manifold of the engine). The valve 30 includes a valve cavity 32 that is connected to the exhaust gas inlet 14 for receiving exhaust gas therefrom, and a valve member 34 that interacts with the valve cavity 32 for regulating flow of exhaust gas from the valve cavity. Although not visible in the figures, the valve cavity 32 is connected to the second volute 26. In partially and fully open positions of the valve member 34, exhaust gas is able to flow from the valve cavity 32 to the second volute 26, but in the closed position of the valve member 34 exhaust gas is prevented from flowing to the second volute 26.

Figure 3:
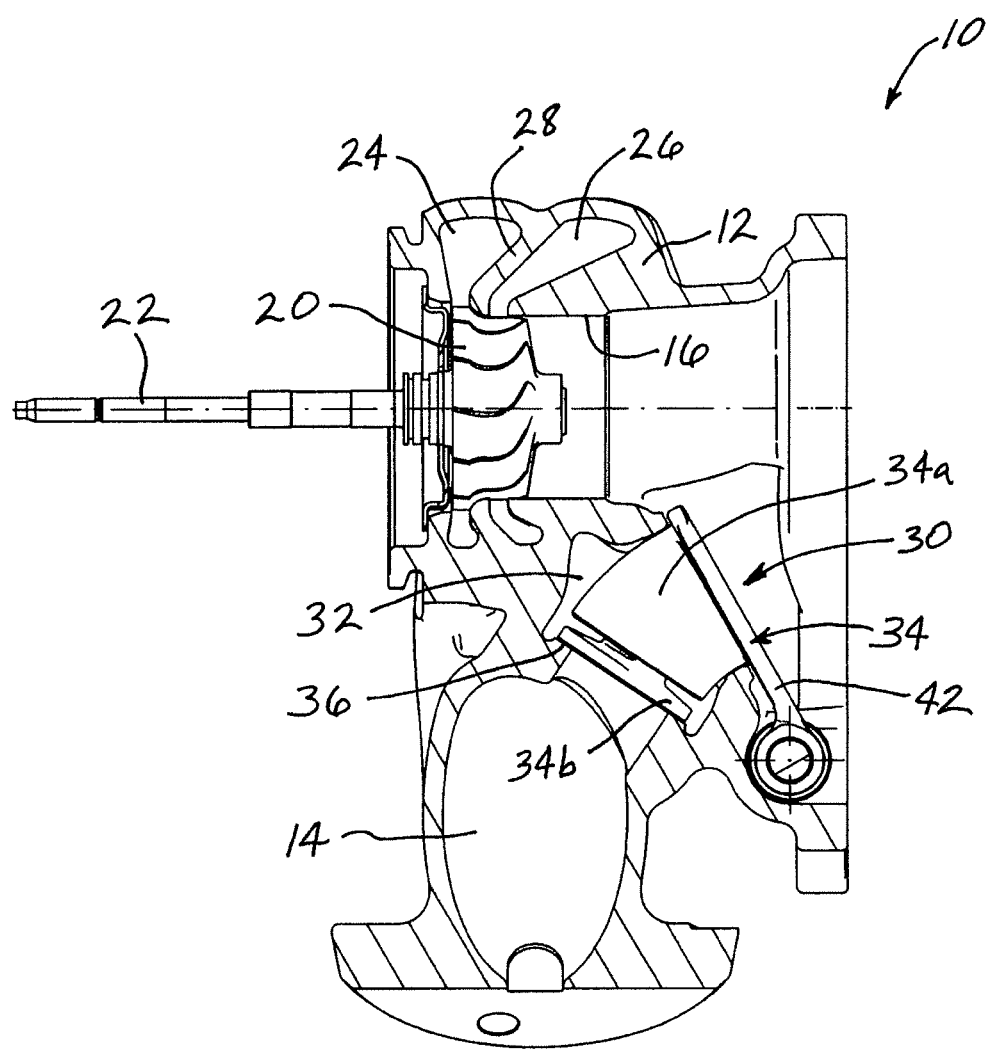
FIG. 3 is a sectioned side view of the turbine assembly with the valve in a closed position.
Figure 4:
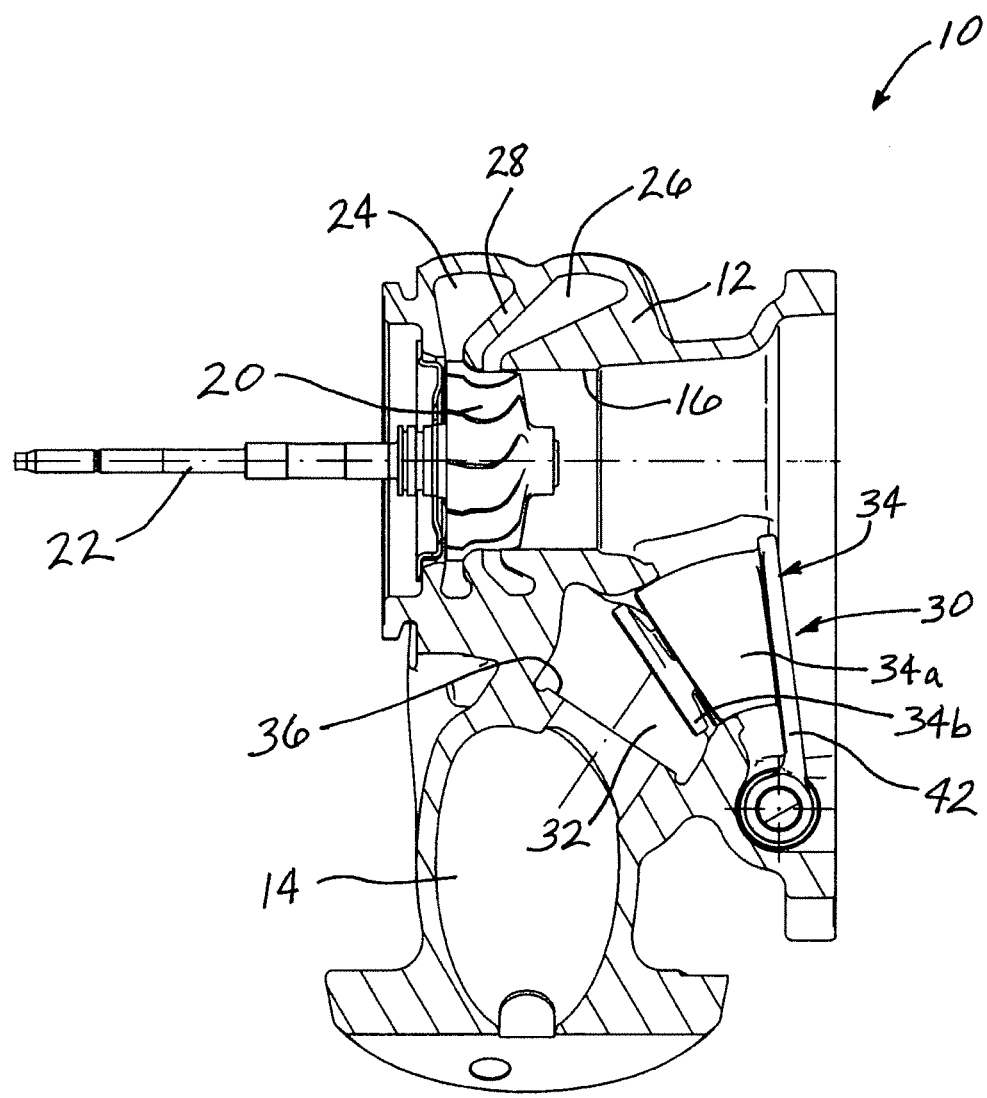
FIG. 4 is a sectioned side view of the turbine assembly with the valve in a partially open position.

The valve 30 also includes a valve seat 36 formed by a portion of the turbine housing and located at a distal end of the valve cavity 32. An opposite proximal end of the valve cavity 32 connects with a bypass passage 40 that extends into the bore 16 at a point downstream of the turbine wheel 20. The valve member 34 is a swing-type waste gate that has a tubular proximal portion 34a affixed to one end of an arm 42, the opposite end of the arm being pivotally connected to the turbine housing such that the valve member 34 is rotatable about a pivot axis. The proximal portion 34a of the valve member is sized so that it substantially fills and closes off the bypass passage 40 when inserted through the bypass passage into the valve cavity 32, as shown in FIGS. 3 and 4. The valve member 34 further comprises a distal portion 34b attached to the end of the proximal portion 34a. The distal portion 34b is configured to seat against the valve seat 36 in a substantially sealed manner when the valve member 34 is inserted fully into the valve cavity 32, as shown in FIG. 3. This is the closed position of the valve member 34, in which the valve member prevents exhaust gas from flowing to the second volute 26 or to the bypass passage 40.

When the valve member 34 is rotated about its pivot axis from the position in FIG. 3 to the position shown in FIG. 4 (the partially open position), the distal portion 34b unseats from the valve seat 36 and thus exhaust gas can flow into the valve cavity 32 and into the second volute 26. However, the engagement of the proximal portion 34a of the valve member 34 in the bypass passage 40 substantially prevents any exhaust gas from flowing through the bypass passage. Thus, in the partially open position of the valve, the first and second volutes 24, 26 feed substantially all of the exhaust gas into the turbine wheel and substantially none of the exhaust gas bypasses the turbine wheel.

When the valve member 34 is further rotated about its pivot axis from the position in FIG. 4 to the position shown in FIG.

5 (the fully open position), the valve member 34 is entirely withdrawn from the valve cavity 32 and bypass passage 40, and therefore exhaust gas can flow from the valve cavity 32 to the second volute 26 as well as through the bypass passage 40 into the bore 16. Thus, in the fully open position of the valve, both volutes feed exhaust gas into the turbine wheel, and in addition some exhaust gas bypasses the turbine wheel.

The valve 30 thus has at least three positions (closed in FIG. 3, partially open in FIG. 4, and fully open in FIG. 5) for regulating flow through the turbine assembly 10. In some embodiments, the valve can have more than three positions. For example, there can be various degrees of openness of the valve in the partially open position—i.e., the partially open position can be adjustable so that a greater or lesser amount of flow is passed to the second volute 26, and this adjustment can be made "on the fly" (e.g., as regulated by a controller that controls an actuator that supplies the motive force for rotating the valve member 34 about its pivot axis) depending upon the needs of the particular operating condition of the engine. Similarly, the fully open position of the valve member 34 can be adjustable for regulating flow through the bypass passage 40.

In accordance with the invention at least in certain embodiments thereof, the first volute 24 and second volute 26 are of different sizes. In particular, the first volute 24 has an A/R ratio less than that of the second volute 26. Additionally, the first volute 24 has its outlet portion 25 positioned to feed exhaust gas into the B-width portion 20a of the turbine wheel 20, while the second volute 26 has its outlet portion 27 spaced axially downstream of the first volute's outlet portion for feeding exhaust gas into the contour portion 20b of the turbine wheel. The turbine wheel can be a non-splittered turbine wheel as illustrated, or a splittered turbine wheel having full blades alternating with splitter blades.

A method for configuring and operating a turbocharged internal combustion engine system in accordance with one embodiment of the present invention comprises the steps of:
- providing a turbocharger having a turbine assembly 10 of the type described above;
- providing an internal combustion engine having a plurality of engine cylinders;
- supplying commingled exhaust gases from all of the engine cylinders into the exhaust gas inlet 14 of the turbine housing;
- positioning the valve member 34 in the first (closed) position when engine exhaust gas flow rate is in a first range, such that the commingled exhaust gases are supplied to the first volute 24 only; and
- positioning the valve member 34 in the second (partially open) position when engine exhaust gas flow rate is in a second range greater than the first range, such that the commingled exhaust gases are supplied to the first volute 24 and the second volute 26.

When the valve further comprises a bypass passage 40 connected from the valve cavity 32 to the bore 16 downstream of the turbine wheel 20, and the valve member 34 is movable into a third position allowing the commingled exhaust gases to flow to the first and second volutes 24, 26 and through the bypass passage 40 to the bore 16, the method can further comprise the step of positioning the valve member 34 in the third position when engine exhaust gas flow rate is in a third range greater than the second range, such that the commingled exhaust gases are supplied to the first volute 24, the second volute 26, and the bypass passage 40.

The invention offers advantages over a conventional single-volute or twin-scroll turbine assembly. With those conventional turbine assemblies, a compromise in design must be made between the desire for a low minimum flow rate at low engine speeds and the desire for a high turbine efficiency at high engine speeds. A conventional single- or twin-volute turbine assembly specifically designed to have a low minimum flow rate tends to be poorer in turbine efficiency at high flow (high engine speed), relative to a similar turbine assembly specifically designed for good efficiency at high flow. Conversely, if the turbine assembly is designed for good efficiency at high flow, then it tends to have a higher minimum flow rate than a similar turbine assembly designed for the low-flow condition. However, with the turbine assembly of the present invention, the sequential activation of the two volutes 24 and 26, together with the ability to specifically design the volutes for low- and high-flow conditions, respectively, result in both a lower minimum flow rate and an improved high-flow efficiency, relative to a similar conventional single- or twin-scroll turbine assembly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbine assembly of a turbocharger for use with an internal combustion engine, the turbine assembly comprising:
    a turbine housing configured for receiving engine exhaust gas, the turbine housing defining a bore for conducting a flow of exhaust gas out of the turbine housing in an axial direction, and a twin volute surrounding the bore, the twin volute comprising a first volute and a second volute that is divided and separated from the first volute;
    a turbine wheel rotatably mounted in the bore, the turbine wheel having turbine blades and defining a B-width portion having an axial length, wherein the B-width portion is the largest-diameter portion of the wheel formed by leading edges of the turbine blades and is linear over the axial length of the B-width portion as viewed in a radial-axial projection of the wheel, the B-width portion being followed in the axial direction by a contour portion that is concave in a radially outward direction as viewed in radial-axial projection, the contour portion being followed in the axial direction by a final portion, the turbine wheel further defining a throat located in the final portion;
    the first volute having an outlet aligned with the B-width portion of the turbine wheel so as to direct exhaust gas to enter into the B-width portion of the turbine wheel;
    the second volute having an outlet aligned with the final portion of the turbine wheel so as to direct exhaust gas to enter into the final portion of the turbine wheel at a location upstream of the throat;
    wherein, of the first and second volutes, only the first volute feeds exhaust gas into the B-width portion of the turbine wheel; and
    a valve arranged to receive engine exhaust gas and regulate flow of the exhaust gas into the first and second volutes.

2. The turbine assembly of claim 1, wherein the second volute has a greater A/R ratio than does the first volute.

3. The turbine assembly of claim 1, wherein the turbine housing has a single exhaust gas inlet for receiving exhaust gas from the engine, and the valve is arranged in the turbine housing downstream of the exhaust gas inlet so as to receive exhaust gas therefrom, the valve defining a valve cavity connected to the second volute but not to the first volute, the valve further comprising a valve member movable between a first position allowing exhaust gas to flow to the first volute but preventing exhaust gas from flowing from the valve cavity to the second volute, and a second position allowing exhaust gas to flow to the first volute and to flow from the valve cavity to the second volute.

4. The turbine assembly of claim 3, wherein the outlet of the first volute has an axial width equal to the axial length of the B-width portion.

5. The turbine assembly of claim 4, wherein the outlet of the second volute is spaced axially downstream of the B-width portion.

6. The turbine assembly of claim 3, wherein the valve further comprises a bypass passage connected from the valve cavity to the bore downstream of the turbine wheel, and wherein the valve member is movable into a third position allowing exhaust gas to flow to the first and second volutes and through the bypass passage to the bore.

7. The turbine assembly of claim 6, wherein the valve cavity has a proximal end adjacent the bypass passage and an opposite distal end, and a valve seat is defined by the turbine housing at the distal end of the valve cavity, the valve member having a distal end portion engaging the valve seat in the first position.

8. The turbine assembly of claim 7, wherein the valve member has a proximal portion configured such that in the partially open position of the valve member the proximal portion occupies and closes off the bypass passage.

9. The turbine assembly of claim 8, wherein the valve is configured and arranged such that in the third position the valve member is completely withdrawn from the valve cavity and the bypass passage.

10. The turbine assembly of claim 9, wherein the valve member is a swing-type waste gate, wherein the proximal portion of the valve member is tubular and is affixed to one end of an arm, an opposite end of the arm being pivotally connected to the turbine housing such that the valve member is rotatable about a pivot axis, wherein the proximal portion of the valve member is sized so as to fill and close off the bypass passage when inserted through the bypass passage into the valve cavity, the distal portion of the valve member being attached to one end of the proximal portion, the distal portion being configured to seat against the valve seat in a substantially sealed manner when the valve member is inserted fully into the valve cavity.

11. The turbine assembly of claim 10, wherein when the valve member is rotated about the pivot axis from the position seated against the valve seat, the distal portion unseats from the valve seat and thus exhaust gas can flow into the valve cavity and into the second volute, while the engagement of the proximal portion of the valve member in the bypass passage prevents exhaust gas from flowing through the bypass passage.

12. The turbine assembly of claim 11, wherein when the valve member is further rotated about the pivot axis from the position having the proximal portion engaged in the bypass passage, the valve member becomes entirely withdrawn from the valve cavity and bypass passage, and therefore exhaust gas can flow from the valve cavity to the second volute as well as through the bypass passage into the bore.

13. A turbine assembly of a turbocharger for use with an internal combustion engine, the turbine assembly comprising:
a turbine housing configured for receiving commingled engine exhaust gases from all cylinders of the engine through a single exhaust gas inlet of the turbine housing, the turbine housing defining a bore for conducting a flow of exhaust gas out of the turbine housing in an axial direction, and a twin volute surrounding the bore, the twin volute comprising a first volute and a second volute that is divided and separated from the first volute;
a turbine wheel rotatably mounted in the bore;
a valve disposed downstream of the single exhaust gas inlet and arranged to receive engine exhaust gas from the exhaust gas inlet and regulate flow of the exhaust gas into the first and second volutes, the valve comprising:
a valve cavity defined in the turbine housing, the valve cavity being connected to the second volute but not to the first volute;
a bypass passage connected from the valve cavity to the bore downstream of the turbine wheel;
the valve cavity having a proximal end adjacent the bypass passage and an opposite distal end, and a valve seat defined by the turbine housing at the distal end of the valve cavity;
a valve member comprising a swing-type waste gate having a proximal portion and a distal portion, wherein the proximal portion is tubular and is affixed to one end of an arm, an opposite end of the arm being pivotally connected to the turbine housing such that the valve member is rotatable about a pivot axis, wherein the proximal portion of the valve member is sized so as to fill and close off the bypass passage when inserted through the bypass passage into the valve cavity, the distal portion of the valve member being attached to one end of the proximal portion, the distal portion being configured to seat against the valve seat in a substantially sealed manner when the valve member is inserted fully into the valve cavity so as to prevent exhaust gas from entering the valve cavity,
wherein when the valve member is rotated about the pivot axis from the position seated against the valve seat, the distal portion unseats from the valve seat and thus exhaust gas can flow into the valve cavity and into the second volute, while the engagement of the proximal portion of the valve member in the bypass passage prevents exhaust gas from flowing through the bypass passage,
and wherein when the valve member is further rotated about the pivot axis from the position having the proximal portion engaged in the bypass passage, the valve member becomes entirely withdrawn from the valve cavity and bypass passage, and therefore exhaust gas can flow from the valve cavity to the second volute as well as through the bypass passage into the bore.

* * * * *